United States Patent [19]

Muller

[11] 4,099,104
[45] Jul. 4, 1978

[54] BRUSHLESS D-C MOTOR SYSTEM

[75] Inventor: Rolf Müller, St. Georgen, Germany

[73] Assignee: Papst-Motoren KG, St. Georgen, Germany

[21] Appl. No.: 778,674

[22] Filed: Mar. 17, 1977

[30] Foreign Application Priority Data

Mar. 24, 1976 [DE] Fed. Rep. of Germany ....... 2612464

[51] Int. Cl.² ........................................... H02K 29/00
[52] U.S. Cl. .................................... 318/138; 318/254; 318/439
[58] Field of Search ........................ 318/138, 254, 439

[56] References Cited

U.S. PATENT DOCUMENTS

| | | | |
|---|---|---|---|
| 3,716,769 | 2/1973 | Brunner | 318/138 X |
| 3,840,761 | 10/1974 | Muller | 318/138 X |
| 3,873,897 | 3/1975 | Muller | 318/138 |
| 4,030,005 | 6/1977 | Doemen | 318/138 |

Primary Examiner—Gene Z. Rubinson
Attorney, Agent, or Firm—Flynn & Frishauf

[57] ABSTRACT

To improve low noise operation of a brushless permanent magnet d-c motor, and reduce voltage peaks and stresses on switching transistors connected in series with stator windings thereof, a galvanomagnetic sensing element, such as a Hall generator, is located on the stator positioned in the gap between adjacent poles and subjected to stray leakage flux from the stator poles in such a way — for example by means of soft-iron flux guide elements — that the leakage field from the stator pole which is oppositely poled — at any instant of operation — to the rotor pole which controls operation of the galvanomagnetic sensing element provides a counter-acting flux to the galvanomagnetic sensing element, thus flattening the turn-off flanks of control pulses controlling current flow through the stator winding.

13 Claims, 13 Drawing Figures

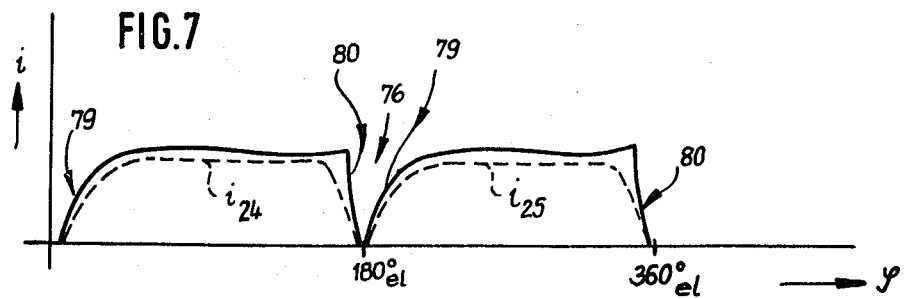
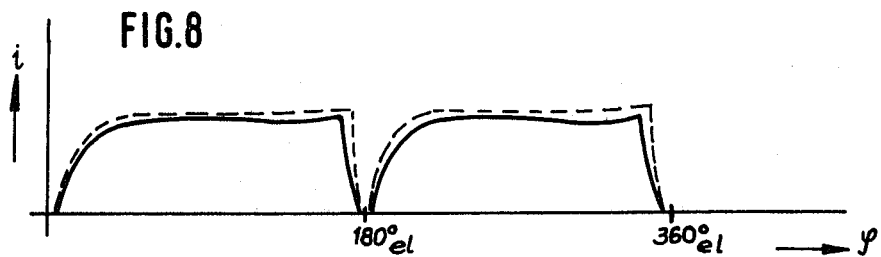
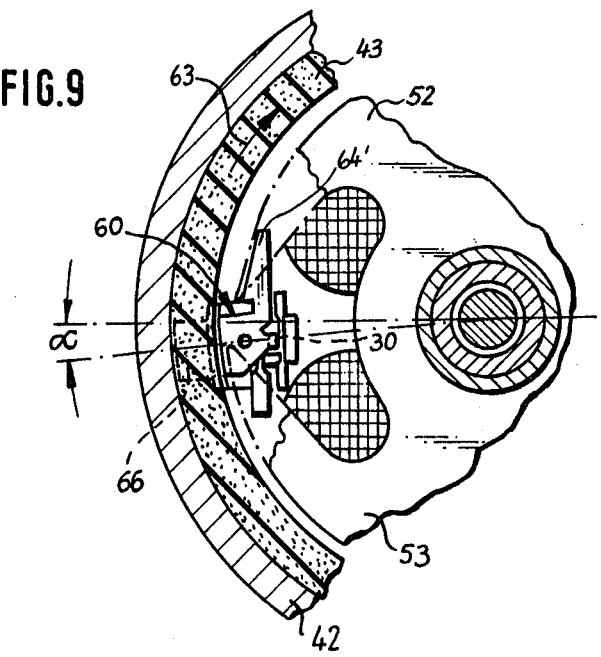

BRUSHLESS D-C MOTOR SYSTEM

Cross reference to related applications and patents, all assigned to the assignee of the present application:

U.S. Pat. No. 3,873,897, Müller; 3,891,905, Müller; U.S. Ser. No. 570,837, Doemen, filed Apr. 3, 1975 now U.S. Pat. No. 4,030,005; U.S. Ser. No. 627,130, Müller, filed Oct. 30, 1975; U.S. Ser. 565,761, Müller, filed Apr. 7, 1975, abandoned and refiled under U.S. Ser. No. 879,143 on Feb. 21, 1978.

The present invention relates to brushless d-c motors, and more particularly to such motors in which a stationary field structure has current flow controlled therethrough by a galvanomagnetic sensing element, for example a Hall generator.

It has previously been proposed to control current flow through stator coils in brushless d-c motors having rotating permanent magnet armatures by commanding conduction or non-conduction of semiconductors connected in series with the stator coil or coils, for example transistors. Galvanomagnetic sensors, such as Hall generators and the like, respond to the magnetic flux derived from the rotor. Reference is made to U.S. Pat. No. 3,873,897 by the inventor hereof, which illustrates a motor of this type.

It is an object of the present invention to improve motors of this type essentially by providing for more quiet running while, additionally, subjecting the semiconductor elements in the control system for the motor to lesser switching loading and stresses.

Subject matter of the present invention

Briefly, the galvanomagnetic sensing element is so located that it is exposed not only to the rotor flux, but additionally to leakage flux from the stator poles in a specific manner, namely such that the flux from the stator which reaches the sensing element has a net flux direction which opposes the flux from the rotor reaching the element. In accordance with a feature of the invention, the galvanomagnetic sensing element is so located as to be influenced by two adjacent stator poles, as well as by the rotor, and positioned such that it is affected by the leakage from both stator poles, yet so arranged that the leakage flux from the stator pole which opposes the pole of the rotor which is opposite the stator, when the stator is energized, predominates over the leakage flux from the stator which is of equal polarity as the rotor pole.

Offhand, it would seem that this opposition of the leakage stator flux counter the rotor flux would be undesirable since it reduces the output signal of the Hall generator due to rotor flux. It has been found, however, that this unusual arrangement reduces switching transients and peaks and therefore contributes to quiet running of the motor while, additionally, decreasing stresses on the semiconductor coupling elements. The decreased response of the galvanomagnetic element, or other components in the system, can be compensated by increasing the amplification of the control system as a whole.

DRAWINGS, ILLUSTRATING AN EXAMPLE

FIGS. 7 and 8 are curves illustrating motor operation;

FIG. 9 is a fragmentary view similar to a portion of FIG. 3, and illustrating another embodiment of the invention;

Figure 1:
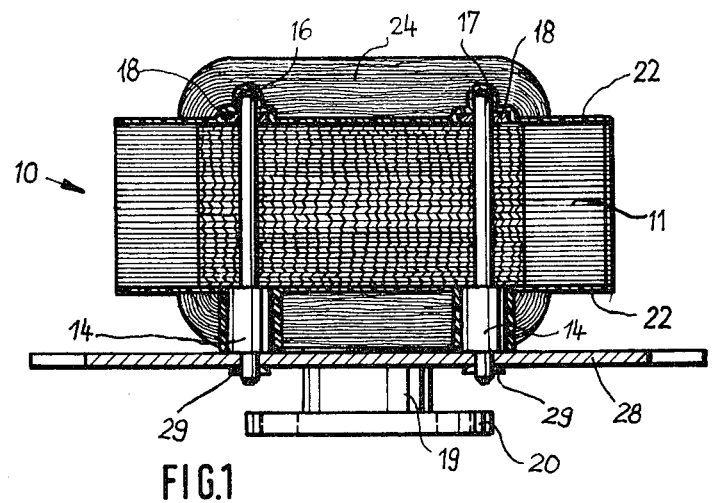
FIG. 1 is a side view, partially in section, of a stator unit of the brushless motor, taken along line I—I of FIG. 3.

The stator of the motor — see FIGS. 1 to 3 and 5 — is the inner portion of the structure; the invention is described in connection with an external rotor motor. The invention is equally applicable to other types of motors as well.

A stack of laminations 11 is held together by three pins 15, 16, 17, each formed with a thickened portion 14. The thickened portion 14 fits against the stack of laminations 11. Reference is made to U.S. application Ser. 570,837, Doemen, filed Apr. 3, 1975, now U.S. Pat. No. 4,030,005, which shows a suitable construction for the magnetic circuit of the stack of laminations. The rotor fitting around the stack of laminations is magnetized with trapeze-shaped magnetization as described in the foregoing U.S. application Ser. 570,837, now U.S. Pat. No. 4,030,005, see, particularly FIG. 3 thereof. The stack of laminations is held together by spring clips, for example C-rings 18, self-holding push nuts or the like.

The laminations are formed with a central opening in which a bearing tube 19 is fitted. The bearing tube 19 has an attachment flange 20 at one end. Before the stack of laminations 11, together with its bearing tube 19 has the windings wound thereof, it is subjected to powder painting, or whirl sintering to coat the entire outside, but not the outer circumference, with a coating 22 of resin. The inside of the tube 19 is likewise left free of resin coating. The stator windings 24, 25 are then introduced into the slots 8 and 9 of the lamination stack 11. The windings do not overlap, as shown. This permits the motor to be made in a flat construction and results in a motor of only small axial dimensions. A space 21, free from windings, will result between the windings.

Figure 2:
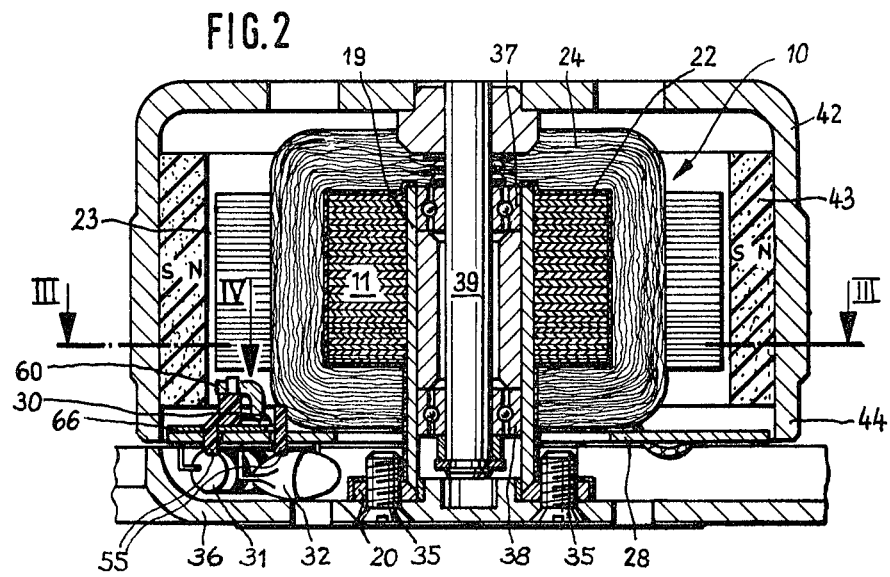
FIG. 2 is a longitudinal sectional view taken along line II—II of FIG. 3.

A circuit board 28 is fitted on the pins on the other side of the thickened portions 14, and attached thereto by means of push clamps, C-rings, or similar attachment elements 29. The plate 28 has a printed circuit secured thereto, to which the connections of the stator windings 24, 25 are soldered. The printed circuit board carries the entire electric switching portion and control section to control current flow through the stator windings 24, 25. The currents are commutated in dependence on rotor position and under command of a galvanomagnetic sensor 30. Galvanomagnetic sensor 30, typically a Hall generator, is likewise secured to board 28. Two electrical circuit components 31, 32 are seen in FIG. 2, secured to printed circuit board 28.

The stator 1 is secured to a motor carrier 36 by attachment of its flange 20 by means of screws 35. The motor carrier may, for example, be a spider or the like for an axial fan used to ventilate electronic apparatus. The drawings show the structure in an enlarged view; the standard axial dimension of such a structure is usually in the order of only about 38 mm.

Figure 3:
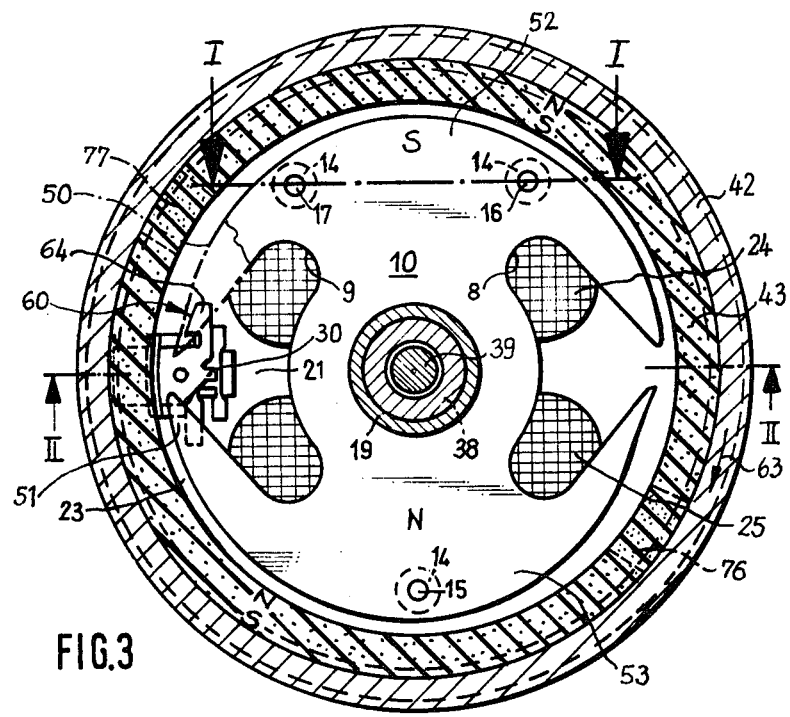
FIG. 3 is a cross section taken along line III—III of FIG. 2.
Figure 5:
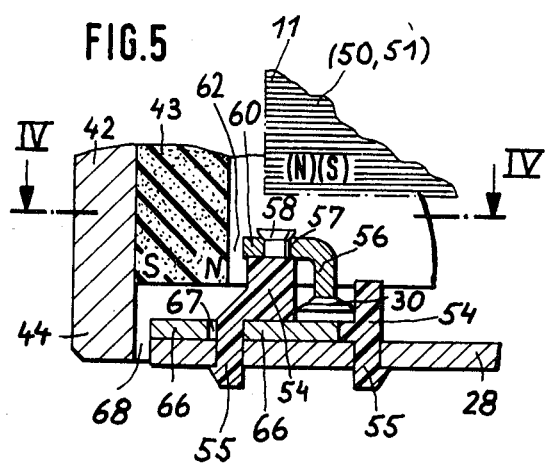
FIG. 5 is a sectional view along line V—V of FIG. 4.

A rotor shaft 39 is journalled by ball bearings 37, 38 in bearing tube 39. Rotor shaft 39 is secured at its upper end to a bell-shaped rotor 42, made of soft iron, and open at the bottom. The rotor bell 42 overlaps and surrounds the stator 10. A continuous ring-shaped magnet 43, for example of ferrite material in a binder, is located within the bell-shaped rotor 42. This ferrite-binder magnet, also referred to as a rubber magnet, is polarized radially, to have north and south poles, as schematically indicated in FIGS. 2, 3 and 5. The magnetization is approximately trapezoidal with relatively small pole gaps 76, 77 (FIG. 3), and as referred to, for example, in the aforementioned application U.S. Ser. No. 570,837, Doemen.

The pole gaps 76, 77 are gaps in the magnetization; they do not form gaps in the material itself. The pole gaps 76, 77 become wider towards the bottom — with respect to FIG. 2 — which is desirable to control the Hall generator 30 (see also cross-referenced application Ser. 570,837, particularly FIGS. 3 and 4 and the accompanying text). The bell-shaped rotor 42 closes the magnetic circuit for the ring magnet 43. The lower free edge 44 of the bell 42 axially extends beyond the ring-shaped magnet 43 — see FIGS. 2 and 5.

The Hall generator 30 is located in a plane parallel to the plane of the drawing of FIG. 3. It is subjected to magnetic flux which extends perpendicularly to the plane of the drawing of FIG. 3. The Hall generator 30 is positioned in the gap between the stator windings 24, 25 and close to the left ends of the pole 50 (FIG. 3) shown in chain-dotted lines and the end 51 of pole 53. The ends 50, 51 of the poles, which may also be pole shoes, surround the left slot 9 and form a comparatively small slot opening in order to permit introduction of the stator windings 24, 25, while pointing towards each other. The stator is symmetrical with respect to its center point, as seen in FIG. 3.

Hall generator 30 is fitted into a plastic holder 54 (FIG. 5) which engages with depending lugs 55 through holes in board 28. The lugs 55 have slight projections so that they can snap through the holes and hold the Hall generator securely against board 28. The holder 54 carries two flux guide elements which guide magnetic flux from the rotor magnet 43 to the Hall generator 30. A first flux guide element is located at the upper side — with reference to FIGS. 2 and 5 — of the Hall generator 30. It is angled and made of soft iron. It is formed with a narrow end 56 which is directed vertically towards the Hall generator 30. It is fitted into the holder 54 and held therein by deforming, under heat, a pin 58 fitting through a hole 57. The holder 54, of plastic, can be readily deformed to securely attach the flux guide. The shape of the flux guide 60 is best seen in top view in FIG. 4. Starting from the portion 56, it becomes wider and extends outwardly to about 4–5 times the width of the portion 56. With its upper, flat portion 61 it extends in the direction towards the ring magnet 43, from which it is separated by an air gap 62 (FIG. 5). A tapering projecting end 64 extends from portion 60 in the direction of rotation of the motor. The direction of rotation is indicated by arrow 63. The end 64 is separated from ring magnet 43 by air gap 65. The air gap 65 is substantially wider than air gap 62, for example 4 to 6 times as wide. As clearly seen in FIG. 3, extension 64 is located beneath the pole tip 50, so that the pole tip 50 of stator pole 52 has a greater extent of overlap with the flux guide element 60 than the pole tip 51 of pole 53. Thus, leakage flux from pole 52 will have a greater influence on the Hall generator 30 than leakage flux from pole 53. With reference to the direction of rotation, see arrow 63, FIG. 4, leakage flux from pole 52 will have a greater effect on the Hall generator 30 than leakage flux from pole 53.

A second flat flux guide element 66 (FIGS. 2, 5) is located beneath the Hall generator 30. The second flux guide element 66, like the first element 60, is also made of soft iron and likewise, preferably, a punched element. It is secured at the lower side of the holder 54 and between holder 54 and board 28. The right extension lug 55 of holder 54 passes through an opening 67 of the second flux guide 66 and fixes it in position. Flux guide element 66 extends from Hall generator 30 up to almost the inner circumference of the lower edge 44 of the bell-shaped rotor 42. It is separated from the edge 44 of the rotor by an air gap 68 (FIG. 5).

Let it be assumed that the position of the rotor, at any instant of time, is as shown in FIG. 5. Thus, a north pole will be opposite guide element 60. Flux will pass from the north pole of the rotor magnet 43 through air gap 62 to the horizontal portion 61 of the upper flux guide element 60, to the vertical portion 56 and then to the Hall generator 30, to continue through the Hall generator and its carrier to the second flux guide element 66, and back through the air gap 68 to the lower edge 44 of the soft-iron rotor bell 42 to close the circuit to the south pole of the magnet 43. The upper flux guide element additionally functions as a flux concentrator, that is, flux in the Hall generator is concentrated and will be greater immediately above the Hall generator 30 than in the air gap 62. This increase in flux density is important in order to obtain an output signal from Hall generator 30 which is of sufficient intensity for control purposes. German Disclosure Documents DT-OS No. 25 14 067 and DT-OS No. 25 14 449, to which U.S. Ser. No. 565,761, Apr. 7, 1975, essentially corresponds, relate to obtaining sufficiently high output signals from a Hall generator.

Figure 4:
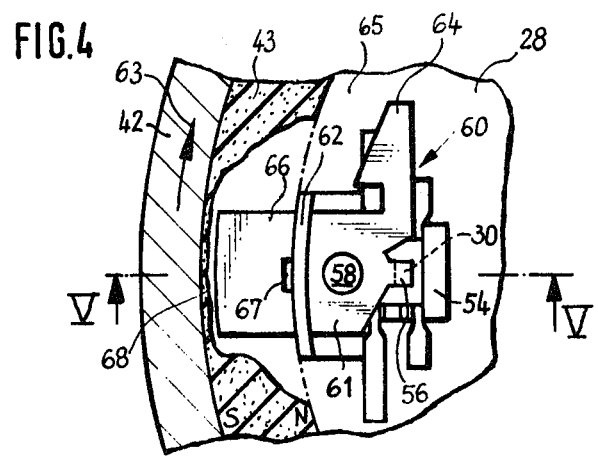
FIG. 4 is an enlarged top view of the galvomagnetic sensor, looked at in the direction of the arrow IV of FIG. 2, and section along line IV—IV.

The output terminals from Hall generator 30 are soldered to the circuit elements on the printed circuit board 28. Some of these terminals are seen in FIG. 4.

Figure 6:
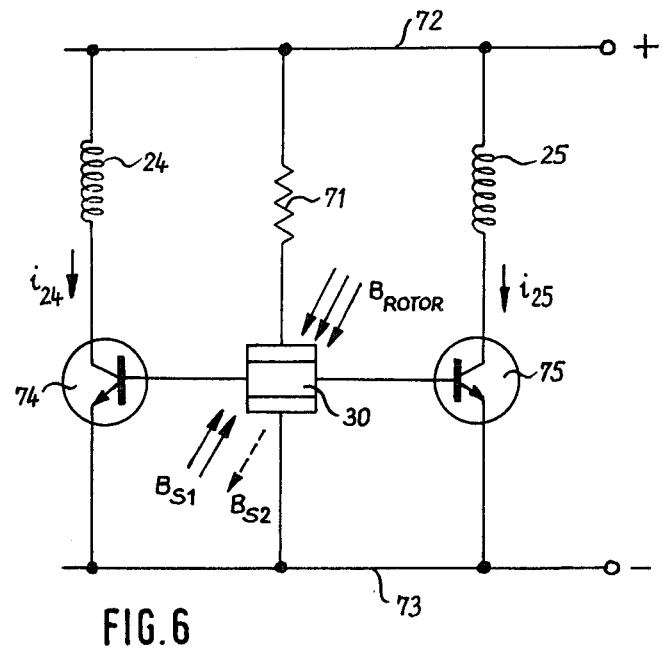
FIG. 6 is a simplified schematic circuit diagram illustrating the operation of the motor.

Various circuit configurations and control systems can be used to control current flow through the windings 24, 25. FIG. 6 shows, in abbreviated form, the general principle of such a circuit. A preferred circuit is described in the above referred-to U.S. application Ser. No. 570,837, Doemen, now U.S. Pat. No. 4,030,005, particularly FIG. 9, and U.S. application Ser. 627,130, by the inventor hereof, filed Oct. 30, 1975. Another circuit is described in German Disclosure Document DT-OS No. 25 55 055. The operation can be understood, however, with reference to the abbreviated circuit illustrated in FIG. 6, from which amplifiers and speed control systems have been omitted for clarity.

Operation; with reference to FIGS. 6, 7 and 8: Hall generator 30 has its control input connected through resistor 71 to positive bus 72 of a power supply. The other control input is connected directly to the negative, reference or ground bus 73. The left output of Hall generator 30 controls conduction of an npn transistor 74. The right output of Hall generator 30 controls conduction of an npn transistor 75. The emitters of transistors 74, 75 are connected to reference bus 73, the collectors to a respective end terminal of stator winding 24, 25, the other respective terminal of which is connected to positive bus 72.

Let is be assumed that a north pole of magnet 43 (FIG. 5) is immediately opposite Hall generator 30. This causes a control output from the left terminal of Hall generator 30 and transistor 74 will become conductive, causing $i_{24}$ to flow in winding 24. As a result, the upper stator pole 52 (FIG. 3) will become a south pole which repels the immediately oppositely positioned south pole of rotor magnet 43 and attracts the north pole of rotor magnet 43. The lower stator pole 53 will be a north pole, as seen in FIG. 3.

If a south pole is located immediately opposite Hall generator 30, transistor 75 will become conductive, current $i_{25}$ will flow in the stator winding 25, and the upper stator pole 52 will become a north pole, the lower stator pole 53 a south pole. If the pole gaps 76 or 77 of the rotor are opposite Hall generator 30, none of the two windings 24, 25 will have current flowing therein, that is, a pulse gap will occur.

The field generated by the stator 10 of the motor thus does not generate a rotary field but rather an electromagnetic alternating field. The shape of the air gap, in combination with the trapeze-shaped magnetization of the rotor causes a reluctance torque which drives the motor even during the gaps of energization of the stator winding.

Hall generator 30 is located in the space between the stator pole shoes; it is located, specifically, in the space 21 free from stator windings 24, 25. Its flux directing element 60 likewise is so located and relatively close to the pole tips 50, 51 and at the opening of groove 9. In operation, leakage flux from the stator lamination stack 11 will affect the flux guide element 60 and hence the Hall generator 30. This is schematically indicated in FIG. 6, where $B_{ROTOR}$ schematically indicates the flux derived from the ring magnet 43 and acting on the Hall generator 30. In operation, the flux from the ring magnet 43 has additional magnetic forces added thereto when current flows in the respective windings 24, 25. Flux $B_{S2}$ is derived from the tip 51 of pole 53, which is clearly apparent from a consideration of FIG. 5. The tip 51 above the flux guide element 60, at the instant of time being considered, is a north pole, and the direction of flux will thus be in the same direction as the flux from rotor magnet 43. The flux $B_{S2}$ thus acts as an enhancement, that is, an assistance to the flux from the rotor tending to increase the amplitude of the Hall generator output. An increase in output from the Hall generator causes in turn increased current flow and further increase in the output from the Hall generator. Thus, the flux from tip 51 acts in the manner of a positive feedback. If the output signal from the Hall generator 30 decreases, the leakage flux $B_{S2}$ likewise decreases and, cumulatively, decreases the output signal from Hall generator 30.

An additional leakage flux acts on Hall generator 30 when the motor is in operation. The tip 50 of pole 52 likewise will have leakage flux $B_{S1}$ affect the flux guide element. In accordance with the invention, the projecting element 64 (FIGS. 3, 4) is so arranged that the leakage flux $B_{S1}$ at any instant is greater than leakage flux $B_{S2}$, as schematically indicated in FIG. 6. Leakage flux $B_{S1}$ thus acts as negative feedback. The magnetic circuit of the motor thus will have a negative feedback effect acting on Hall generator 30 (see also FIG. 5). Arranging the flux guide element so that the negative feedback derived from the leakage flux is greater than the positive feedback has the effect that when the rotor magnet 43 opposite Hall generator 30 is a north pole, the net flux acting on the Hall generator derived from the stator lamination stack has the effect of a south pole, and conversely, when the rotor has a south pole opposite the Hall generator flux guide, the stack of stator laminations 11 provides flux in the north pole direction thereto. The field of the stator thus acts during those periods of time when the stator is energized and the field is present in negative direction, that is, in bucking direction with respect to the flux from the rotor magnet 43.

At first blush, it appears that this is an undesirable result, since the output signal from Hall generator 30 is reduced. FIG. 7 shows currents $i_{24}$ and $i_{25}$ flowing through the respective coils 24, 25. The full-line graph shows current flow absent influences from the leakage field; the dotted graphs, however, show current flow when practicing the present invention, that is, when combining leakage flux as aforesaid with the net leakage flux from the stator opposing the flux from the rotor magnet. As the graphs of FIG. 7 clearly show, the net motor current is reduced. This can readily be compensated by higher amplification of the transistors 74, 75, or by additional amplification stages. Apart from the difference in amplitude, the shape of the full-line and broken-line curves is different. As can be seen, the rate of current change $di/dt$ is reduced at the switch-off portion 80. Thus, due to the feedback, the switching becomes more gentle and is less subject to transients. As a result, the transistors are less highly stressed by voltage peaks, which is particularly important upon interruption of current flow through the inductive windings 24, 25. This contributes to quiet running of the motor. Besides that radio interference is greatly reduced, especially in combination with motors as described in U.S. Pat. No. 3,873,897, having one stator winding only, which produces in operation an alternating magnetic field.

The effect of positive feedback on current flow is illustrated in FIG. 8 in which, again, the solid-line curve shows current flow without additional influence of stray leakage flux on the Hall generator, and the broken line the current flow with such effect. If the positive feedback due to leakage flux from the poles is greater than the negative feedback, with respect to the main flux from the rotor, then the broken-line current distribution would result; current rise as well as drop would be more rapid than without this positive feedback. This causes additional loading on transistors 74, 75 and, during operation, there would be more motor noise. Motor noise is additionally increased due to the magnetostrictive effect arising in the stator laminations upon rapid changes in current flow through the windings.

Embodiment of FIG. 9: In certain motors, particularly high-speed motors, it is desirable to offset Hall generator 30 and its flux directing elements 60, 66 by an angle, $\alpha$ counter the direction of rotation (arrow 63) from the theoretical center of the stator pole gap. To compensate for the increased effect of the positive feedback leakage field $B_{S2}$, the projecting portion 64' is elongated and widened so that, as before, the field $B_{S1}$ from stator pole 52 exceeds the effect of $B_{S2}$ from stator pole 53 so that, as far as the leakage field is concerned, there is a net negative or bucking field effect on the Hall generator 30 with respect to flux from the rotor.

It is not necessary to utilize flux guide elements or flux concentrating iron structures to generate the additional flux effect on the Hall generator 30. For example, the pole tip 50, or a similar pole shoe, can have a soft-iron element secured thereto in order to increase the effect of the leakage flux from the respective pole to the Hall generator 30 in such a manner that the leakage flux from pole tip 50 exceeds that which affects the Hall generator and is derived from pole tip 51. Basically, the position and arrangement of the Hall generator with respect to the leakage flux from the stator poles should be such that there is a net leakage flux counter-acting the main flux acting on the Hall generator and derived from the rotating magnet. Various changes and modifications can be made, and other galvanomagnetic sensors than Hall generators can be used, for example magnetic field plates, magnetic responsive diodes, Hall integrated circuits, and the like.

The present invention is suited for various types of motors, and also for motors having only one stator winding disclosed, for example, in U.S. Pat. No. 3,891,905, by the inventor hereof, see particularly FIGS. 9 to 12 thereof.

Figure 10:
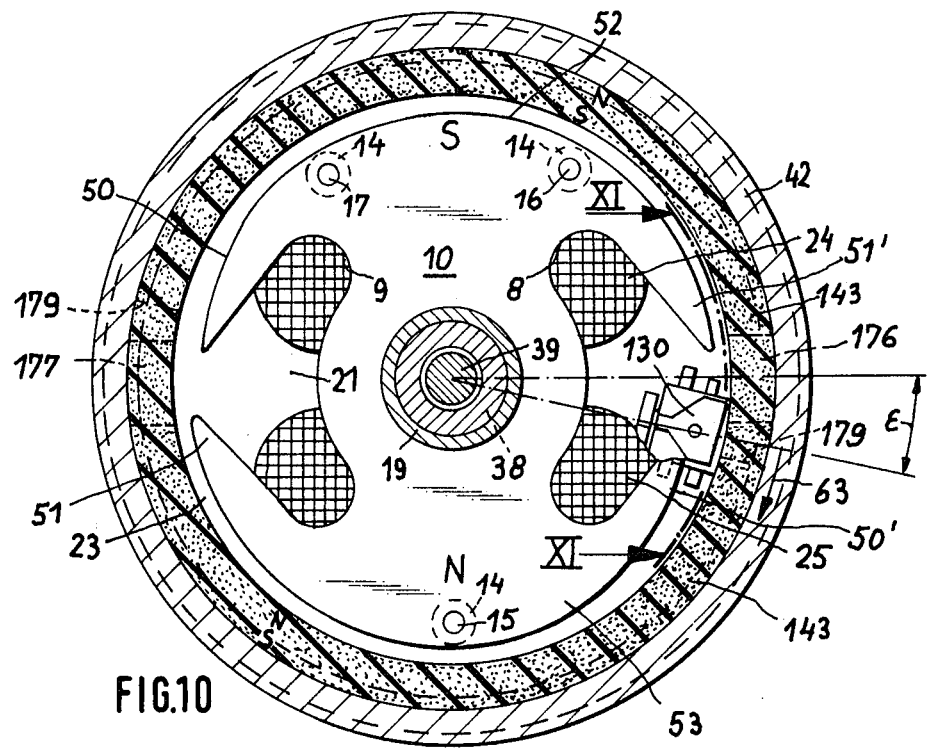
FIG. 10 is a sectional view similar to FIG. 3, and illustrating a third embodiment.

The flux directing elements 60, 66 are not strictly necessary. Referring to FIG. 10, in which elements having a special effect in this embodiment have been given the same reference numerals as before, but incremented by 100.

Figure 11:
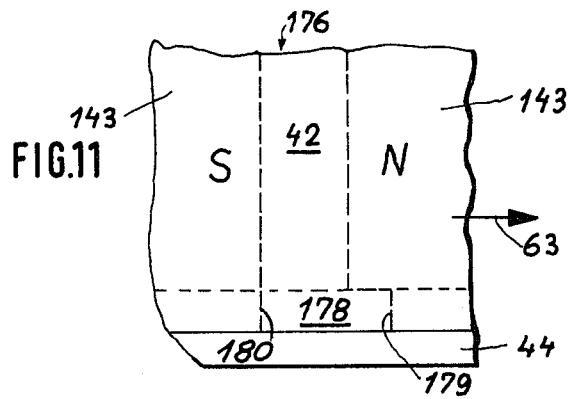
FIG. 11 is a section along line XI—XI of FIG. 10 and showing the rotor magnet.

Sensor 130 which, for example, may be similar to the sensor described in U.S. application Ser. No. 565,761, filed Apr. 7, 1975, and assigned to the assignee of the present application, is offset by an angle $\epsilon$ of about 5° to 60° — e1. in the direction of rotation, as shown by arrow 63. This offsetting increases the portion of the stator leakage flux which is counter the direction of the flux from the rotor. The rotor pole gaps 176, 177 (FIG. 10) 11, 12 have an edge portion 179, (180) which is also (!!) shifted forwardly with respect to the direction of rotation 63. This edge portion is placed in the region 178 which acts on the sensor 130. This additional change leads to a sooner or quicker rise of the rising current portion 79 (FIG. 7), thus additionally contributing to a full effective motor current and also of additional importance at faster motors (similar as the construction of FIG. 9.) in operation. FIG. 11 shows the magnetic distribution, the portion 42, forming the outer rotor bell being indicated in the drawing to represent the gaps between poles, although the poles may be a continuous element, as well as the segments 143 illustrated in FIG. 10.

Figure 12:
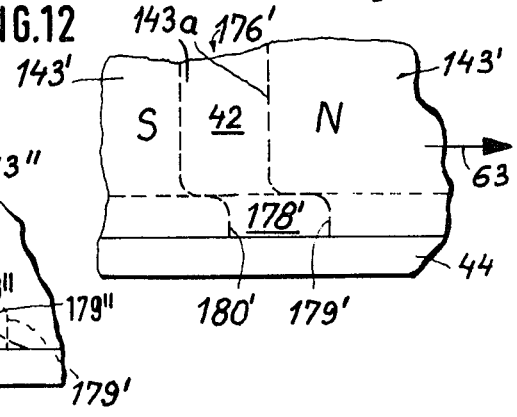
FIGS. 12 and 12a are sections along line XI—XI of FIG. 10 and illustrate another embodiment.
Figure 12A:
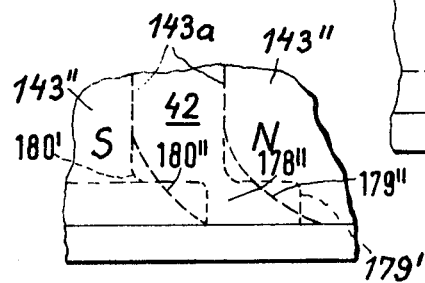

The edge portion 179, 180 may have different forms. FIG. 12 illustrates a variation of the region 178 in the gaps of the rotor poles acting on the sensor. The region 178 is enlarged in the direction of rotation in the embodiment of FIG. 11 — which, it is to be noted, is taken circumferentially in accordance with the arrows XI—XI on FIG. 10. In the embodiment of FIG. 12, however, the region 178' has two offsets, one for each pole. The region 179', in the direction of rotation, is offset more than the other end portion 180' which would, otherwise, fall in the middle of the gap between poles. The region 179' need not be stepped, as shown, but rather the north pole 143' can be smoothly curved at the bottom as shown in FIG. 12a, where only the pole end pieces are shown in pictorial aspect. The broken lines 179', 180' illustrate the embodiment of FIG. 12 for comparison of relative alignment; the smooth end portions 179", 180" in the region of the pole gap 178" have a similar effect.

The transitions between the straight portion 143a (FIG. 12) of the poles and the rounded sections 179', 180'; 179", 180" are preferably rounded. The flux distribution, in actual practice, will then follow essentially the shape of the magnets. Transition of flux should be smooth, and not abrupt, and the embodiment shown in full lines of FIG. 12a provides additionally improved smooth variation in current flow through the coils due to the sensing and control action of the respective galvanomagnetic sensing elements 30, 130.

Other changes and modifications may be made, and features described in connection with any one of the embodiments can be used with any of the others, within the scope of the inventive concept.

Because of the inductivity of stator windings the current rise 79 in FIG. 7 is often too slow at high speed motors. This problem is solved according to FIG. 9 by shifting angle $\alpha$ and according to FIGS. 10, 11, 12 by means of shifting the pole gaps in the direction of the rotation too. This results in an then(!) advantageous "early commutation".

I claim:

1. Brushless d-c motor system having a rotor including a rotating permanent magnet field structure (43, 143);

a stator including a stationary stator pole structure (52, 53) having adjacently located poles of opposite polarity;

at least one stator winding (24, 25) on the stator pole structure;

current control means (74, 75) connected in series with said stator winding to control current flow therethrough and hence the magnetic flux derived from the stator poles;

and a galvanomagnetic sensing element (30, 130) located on the stator, positioned to be within the magnetic field of the rotor, and electrically connected to the current control means (74, 75) to control current flow to the stator;

wherein, in accordance with the invention, the galvanomagnetic sensing element (30, 130) is magnetically exposed to the leakage flux from the stator poles and in magnetic coupling relation to said leakage flux such that the flux from the stator reaching the sensing element has a net flux in a direction which opposes the flux from the rotor reaching the sensing element.

2. System according to claim 1, wherein the galvanomagnetic sensing element is located to be influenced by two adjacent stator poles and positioned in a location in which the leakage flux from the stator pole of opposite polarity to the rotor pole is predominant over the leakage flux from the stator pole of the same polarity as that of the rotor pole, at any instant of energization of the stator poles and the respective position of the rotor pole in flux transmitting relationship to the galvanomagnetic element.

3. System according to claim 1, further comprising a flux guide element (60, 66) of soft ferromagnetic material in flux transmitting relationship to the galvanomagnetic sensing element (30, 130), the flux guide element being in magnetic flux coupling relationship to both stator poles (52, 53), and providing a flux guide path of lesser reluctance from the pole, when energized, of a polarity opposite to the pole of the rotor than the reluctance of the flux path from the pole of the same polarity as the rotor so that the flux from the stator counteracting the flux from the rotor predominates the flux from the stator which is of the same flux direction as the flux from the rotor.

4. System according to claim 1, wherein the motor is formed with an essentially cylindrical air gap (23);
the stator provides an alternating electrical field;
the stator pole structure comprises stator poles (52, 53) separated by stator pole gaps;
wherein the galvanomagnetic sensing element (30, 130) is located approximately in the gap between the stator poles;
and a flux guide element (60) is provided, coupled to the magnetic field of the permanent magnet rotor (43, 143) and includes a projecting portion (64) projecting in the direction of rotation of the motor and located to be in magnetic coupled relation with the leakage field from the stator pole (52) following — with respect to the direction of rotation (63) of the motor — the sensing element (30, 130).

5. System according to claim 4, wherein the flux guide element is in magnetic coupled relation with the leakage flux from two adjacent stator poles, the flux guide element preferentially guiding flux at a higher flux level from the pole (52) following the sensor (30, 130) than the pole (53) in advance of the sensor (30, 130).

6. System according to claim 1, wherein the stator provides an alternating electrical field;
the stator pole structure comprises stator poles (52, 53) separated by stator pole gaps; and
the galvanomagnetic sensing element (30, 130) is located offset with respect to the gap between the stator poles in a direction counter the direction of rotation (63) of the motor.

7. System according to claim 6, further comprising a flux guide element (60) coupled to the magnetic field from the permanent magnet rotor (43) and having a portion thereof (64) coupled to the leakage flux from the stator pole (52) following — in the direction of rotation — the sensor.

8. System according to claim 4, wherein the flux guide element is formed with a projecting portion (64), the projecting portion defining a first air gap (65) with the rotor magnet;
the flux guide element having a rotor flux portion (61) and a second air gap (62) between the rotor flux portion (61) and the rotor magnet (43);
and wherein the first air gap is larger than the second air gap.

9. System according to claim 1, wherein the galvanomagnetic sensor is a Hall generator (33).

10. System according to claim 1, wherein the stator provides an alternating electrical field;
the stator pole structure comprises stator poles (52, 53) separated by stator pole gaps;
the galvanomagnetic sensing element (130) is located in the gap between the stator poles and offset by an angle ($\epsilon$) from the median line between two adjacent stator poles in the direction of rotation (63) of the motor;
and wherein the pole gaps of the rotor magnet controlling the galvanomagnetic sensor are offset relative to the pole gaps of the region of the rotor in electromagnetic interaction with the stator in the direction of rotation.

11. System according to claim 10, wherein the offset angle ($\epsilon$) is in the range of between about 5° to 60°-electrical.

12. System according to claim 1, wherein the stator pole structure comprises stator poles separated by a stator pole gap;
the galvanomagnetic sensing element (30, 130) is located approximately in the gap between the stator poles;
and a flux guide element (60) is provided, coupled to the magnetic flux of the permanent magnet rotor (43, 143), and includes a projecting portion (64) projecting in the direction of rotation of the motor and located to be in magnetic coupled relation to the leakage flux from the stator pole (52) following — with respect to the direction of rotation (63) of the motor — the sensing element (30, 130).

13. System according to claim 12, wherein the flux guide element (60) further comprises a second portion in magnetic coupled relation to the leakage flux from the stator pole (53) preceding — with respect to the direction of rotation (63) of the motor — the sensing element (30), said further portion of the flux guide element (60) providing a lesser flux transfer of leakage flux to the galvanomagnetic sensing element (30, 130) than said first portion (64) to subject sid galvanomagnetic sensing element (30, 130) to a net leakage flux from the stator poles in opposition to the flux affecting the galvanomagnetic sensing element from the permanent magnet rotor (43, 143).

* * * * *